Patented Jan. 31, 1928.

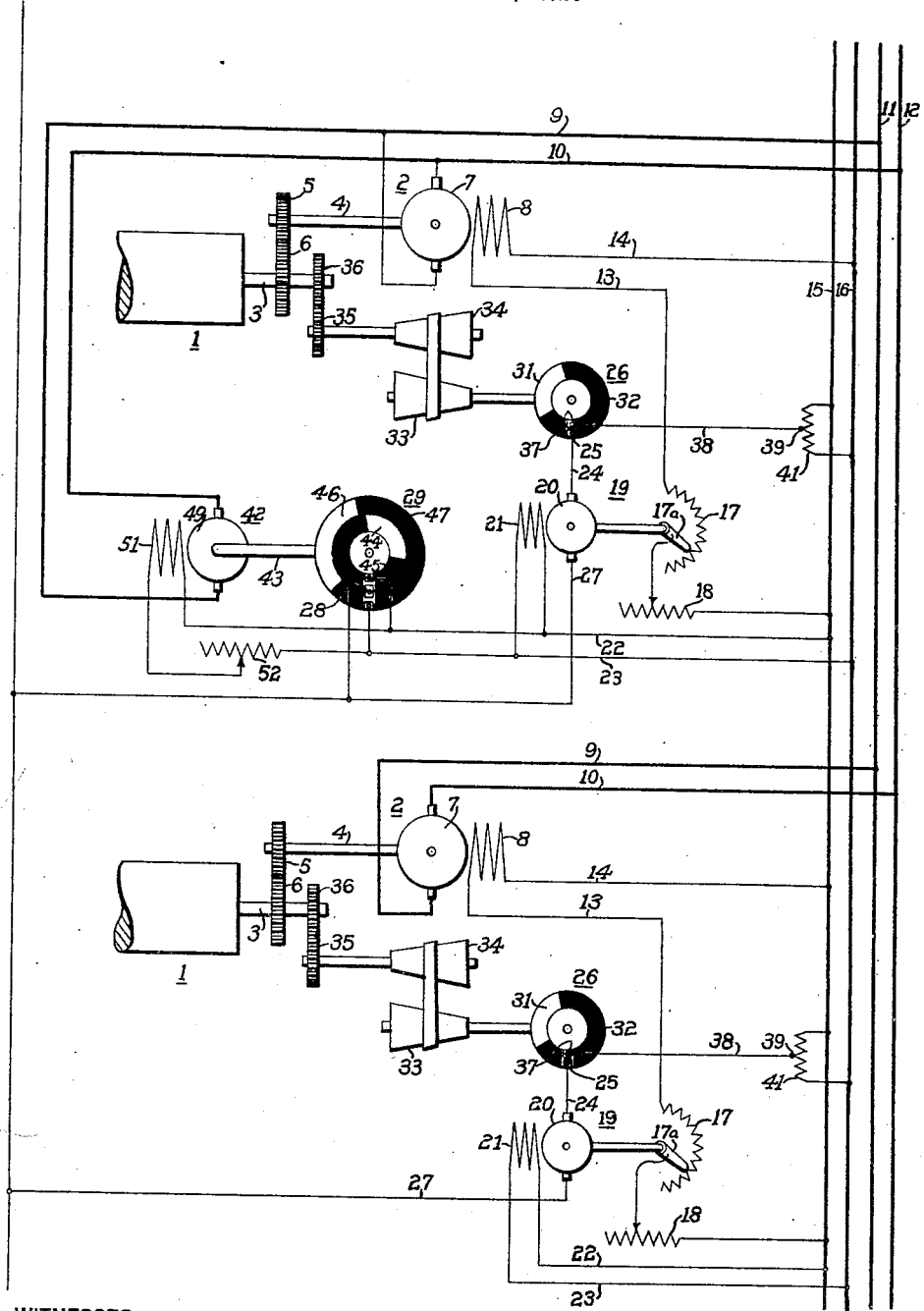

1,657,513

UNITED STATES PATENT OFFICE.

WILLIAM E. MENZIES, OF IRWIN, PENNSYLVANIA, ASSIGNOR TO WESTINGHOUSE ELECTRIC & MANUFACTURING COMPANY, A CORPORATION OF PENNSYLVANIA.

REGULATOR SYSTEM.

Application filed June 14, 1923. Serial No. 645,279.

My invention relates to regulator systems and more particularly to regulator systems for maintaining a number of machines at definite relative speeds that are variable at will.

One object of my invention is to provide a regulator system that shall govern the speeds of a number of motors and that shall maintain a substantially constant speed ratio between them.

Another object of my invention is to provide a regulator system of the above-indicated character in which the amount of correction upon each motor is directly proportional to its angular displacement from normal with respect to a master speed reference means.

A still further object is to provide a system of the class under consideration in which a convenient interval of time, which may be varied, is introduced between the periods of correction to prevent overtravel of the speed correcting means and thus prevent hunting action in the controlled motor.

In many industrial applications, it is essential to operate a number of rotating members at a constant speed or to maintain a constant speed ratio, variable at will, between a number of moving parts. Thus, in the case of paper-making machines, it is necessary that the speed ratio between the various sets of paper rolls be maintained constant in order to prevent breaking of the paper that is passing between the sets of rolls.

In a regulator system constructed in accordance with my invention as applied to a paper-making machine, each set of paper rolls is individually motor driven and the various motors are so controlled as to maintain a substantially constant speed ratio between them.

In the accompanying drawing, the single figure is a diagrammatic view of a system of control organized in accordance with my invention for maintaining a plurality of machines at definite relative speeds and at the same time affording a convenient means for varying the speed relation.

The armatures of a speed reference motor termed a "master" motor and of motors to be regulated termed "section motors", are connected in parallel relation across a variable voltage direct-current circuit. The speed of the machine as a whole, that is, the joint speeds of all the motors, may be controlled by varying the voltage applied to the armatures of the several motors, as, for example, by the well known Ward Leonard system. As the voltage applied to the motor armatures is varied, the speeds of the several machines vary in approximately the same proportion. The field circuits, which are energized from a constant-voltage direct-current system, are not appreciably affected thus acting to maintain the same relative speeds between the several motors.

Referring to the accompanying drawing, a paper-making machine is shown as provided with a plurality of sets of rolls 1, only two such rolls being illustrated in the drawing for the sake of simplicity. Rolls 1 are driven by a direct-current motor 2 by means of shafts 3 and 4, which are connected through the gear wheels 5 and 6. Each motor 2 has an armature 7 and a field winding 8. The armature is connected by means of conductors 9 and 10 to variable-voltage supply-circuit conductors or bus bars 11 and 12. Each field winding 8 is connected by means of conductors 13 and 14 to constant-voltage bus bars 15 and 16. An automatically controlled rheostat 17 and a manually controlled resistor 18 are connected in circuit with each field winding 8.

The movable arm 17ª of the automatically controlled rheostat 17 is actuated by a direct-current pilot motor 19 having an armature 20 and a field winding 21. The field winding 21 is connected by means of conductors 22 and 23 to the constant-voltage direct-current bus bars 15 and 16. One side of the armature circuit is connected by means of conductor 24 to a brush 25 that rests upon a motor-driven commutator 26. The other side of the motor armature is connected by means of conductor 27 to a brush 28 that rests upon a motor-driven master commutator 29.

The section commutator 26 is composed of a conducting segment 31 which extends for approximately one-third of the operative cycle of the commutator and a non-conducting segment 32 extending for approximately two-thirds of the operative cycle of said commutator.

The commutator 26 is driven by means of cone pulleys 33 and 34 and gear wheels 35 and 36, in accordance with the speed of the paper roll 1. Voltage is applied to the commutator 26 by means of a brush 37, which is connected by conductor 38 to the mid-point 39 of a ballast resistor 41, the terminals of which are connected to the constant-voltage bus bars 15 and 16. The resistor 41 thus serves to provide a potential approximately mid-way between that of the constant-voltage bus bars thereby giving the equivalent of a three-wire system.

The master commutator 29 is driven by the master motor 42 by means of shaft 43. The commutator 29 is composed of two concentrically or otherwise related portions one having a conducting segment 44 and a non-conducting segment 45, the other having a conducting segment 46 and a non-conducting segment 47. Each of the conducting segments 44 and 46 extends for substantially one-third of the operative cycle of the commutator and the segments are so positioned with respect to each other that the brush 28 in passing over these segments will be in contact with only one of them at a time and will rest jointly on the non-conducting segments 45 and 47 for approximately one-third of the operative cycle of the commutator.

The master motor 42 has a commutator-type armature 49 and a field winding 51. The armature 49 is connected to the variable voltage bus bars 11 and 12. The field winding 51 is connected to the constant voltage bus bars 15 and 16 through a variable resistor 52.

A study of the above-described structure will reveal the fact that if the master commutator 29 and the section commutators 26 move at the same speed and maintain such relative positions that the conducting portion of one of the section commutators passes under its brushes at the same time that the joint non-conducting portions of the master commutator pass its three brushes, there will be no flow of current through the pilot motor control circuit. However, a slight shifting in either direction of one of the section commutators with respect to the master commutator, such as would be caused by any condition that would tend to vary the speed of the corresponding section motor, will result in a flow of current in the control circuit for a certain period of time during each revolution. This period of time will be proportional to the magnitude of the displacement of the section commutator 26 with respect to the master commutator 29.

Further reflection will reveal the fact that the direction of flow of current in the control circuit is reversed as the direction of displacement of one commutator with respect to the other is reversed. This is due to the fact that the brush 25 is connected through commutator 26 with the conductor 38, while the brush 28 is connected by means of segment 44 or 46 of the commutator 29 and the corresponding brush to one of the conductors 15 or 16. Since the conductor 38 is supplied with a voltage intermediate that of the conductors 15 and 16 current will flow through the motor 19 toward the conductor 38 when the brush 28 is connected to the conductor of higher potential than the conductor 38, and current will flow from the conductor 38 through the motor 19 when the brush 28 is connected to the conductor of lower potential than the conductor 38.

As illustrated, the pilot motor 19 is governed by controlling the flow of current through the armature winding of the motor. Obviously, the armature and field connections might be interchanged, and the motor actuated by controlling the flow of current through the field winding of the motor.

This feature is utilized to obtain automatic correction by controlling the current in the armature circuit of the pilot motor 19, which governs the variable resistor 17. The resistor 17, being connected in the field circuit of the section motor 2, controls the speed of said section motor by varying the excitation thereof. It is obvious that, if the armature of the pilot motor 19 is connected in the control circuit in such a manner that a displacement of the section commutator 26 with respect to the master commutator 29, such as would be brought about by a reduction in speed of the section motor 2, causes the pilot motor to operate the rheostat 17 in a manner to weaken the field of the section motor, then the system will automatically correct the speed of the motor 2 within the limits of the resistor. Conversely, if the displacement of the section commutator 26 with respect to the master commutator 29 becomes such as would be brought about by an increase in speed of the section motor 2, the pilot motor 19 operates the rheostat 17 in such a manner as to strengthen the field of the section motor and thus reduce its speed to normal.

The above-described structural details are diagrammatically shown, serving only to illustrate the principle of operation of the system. Other modifications in the system and in the arrangement and location of parts may be made within the spirit and scope of my invention and such modifications are intended to be covered by the appended claims.

I claim as my invention:

1. In a regulator system, the combination with an electric motor to be controlled and a separate speed member, of variable resistor means for gradually varying the excitation of said motor, electroresponsive means for actuating the variable resistor means, commutators for said motor and for the separate speed member, a source of energy comprising a pair of conductors, said commutator for said separate speed member being adapted to connect one side of said electroresponsive means alternately to opposite sides of said source, and a second source of energy comprising a conductor having a different voltage from the conductors of the first-named source, said commutator for said controlled motor being adapted to make and break connections with said second source.

2. In a regulator system, the combination with an electric motor to be controlled and a separate speed member, of variable resistor means for gradually varying the excitation of said motor, electroresponsive means for actuating the variable resistor means, a direct-current supply circuit, means for causing one terminal of the electroresponsive means to be connected alternately to opposite sides of said supply circuit, a conductor having a potential intermediate that of said direct-current supply circuit, and means for causing the other terminal of the electroresponsive means to be intermittently connected to said conductor.

3. In a regulator system, a main motor, a master speed reference means, pilot motor means, means for varying the excitation of the main motor comprising variable resistor means actuated by said pilot motor means, master commutator means rotated in synchronism with said master speed reference means, and other commutator means rotated proportionally to the speed of said motor, a pair of conductors for supplying electrical energy, said master commutator means being adapted to connect one terminal of said pilot motor means to one of said conductors for approximately one third of its cycle, said other commutator means being adapted to connect the other terminal of said pilot motor means for approximately one third of its cycle to be energized by a potential intermediate that of said conductors.

4. In a regulator system, a section motor to be regulated, a master commutator, a section-motor-regulating commutator and means for permanently varying the speed of the section-motor-regulating commutator with respect to said section motor, a pilot motor circuit, said section-motor-regulating commutator being adapted to energize one conductor of said pilot motor circuit for approximately one third of its operative cycle, said master commutator being adapted to energize the second conductor of the pilot motor circuit for approximately one third of its operative cycle at a potential higher than that of the first conductor and for approximately one third of its operative cycle at a potential lower than that of the first conductor, pilot motor means disposed in said pilot motor circuit, and means actuated thereby for varying the excitation of the section motor.

In testimony whereof, I have hereunto subscribed my name this 6th day of June 1923.

WILLIAM E. MENZIES.